United States Patent [19]
Chen et al.

[11] Patent Number: 5,926,587
[45] Date of Patent: Jul. 20, 1999

[54] OPTICAL PASSBAND FILTERS

[75] Inventors: Jerry Chia-yung Chen, Keyport; Corrado Dragone, Little Silver, both of N.J.

[73] Assignee: Lucent Technologies Inc., Murray Hill, N.J.

[21] Appl. No.: 08/925,515

[22] Filed: Sep. 8, 1997

Related U.S. Application Data

[51] Int. Cl.$^6$ ................................................. G02B 6/12
[52] U.S. Cl. ............................. 385/14; 385/16; 385/37; 385/46
[58] Field of Search ................................. 385/14, 37, 15, 385/16, 17, 46, 20, 21, 24, 129–130

[56] References Cited

U.S. PATENT DOCUMENTS

| | | | |
|---|---|---|---|
| 5,414,548 | 5/1995 | Tachikawa et al. | 385/14 X |
| 5,467,418 | 11/1995 | Dragone | 385/37 |
| 5,488,680 | 1/1996 | Dragone | 385/24 |
| 5,623,571 | 4/1997 | Chou et al. | 385/130 |
| 5,748,811 | 5/1998 | Amersfoort et al. | 385/37 X |

OTHER PUBLICATIONS

"Flat spectral response arrayed–waveguide grating multiplexer with parabolic waveguide horns", by K. Okamoto and A. Sugita, Electronics Letters, Aug. 29, 1996, vol. 32, No. 28, pp. 1661–1662.

"Eight–Channel Flat Spectral Response Arrayed––Waveguide Multiplexer with Asymmetrical Mach–Zehnder Filters", by K. Okamoto et al., IEEE Photonics Technology Letters, vol. 8, No. 3, Mar. 1996, pp. 373–374.

"Arrayed–waveguide grating multiplexer with flat spectral response", by K. Okamoto and H. Yamada, Jan. 1, 1995, vol. 20, No. 1., Optics Letters, pp. 43–45.

"Use of Multimode Interferences Couplers to Broaden the Passband of Wavelength–Dispersive Integrated WDM Filters", by J.B.D. Soole et al., IEEE, Photonics Technology Letters, vol. 8, No. 10, Oct. 1996, pp. 1340–1342.

"Use of Multimode Interference Couplers to Broaden the Passband of Dispersive Integrated WDM Filters", by J.B.D. Soole et al., IMCA4–1, pp. 44–47.

"General self–imaging properties in N x N multimode interference couplers including phase relations", by M. Bachmann et al., Applied Optics, Jun. 20, 1994, vol. 33, No. 18, pp. 3905–3911.

Primary Examiner—Phan T. H. Palmer

[57] ABSTRACT

Two or more wavelength routers are cascaded together to form a passband filter with low levels of crosstalk between different channels of a wavelength division multiplexing (WDM) stream. Cascading wavelength routers is a technique that can be used to efficiently realize wide and flat passbands, but high levels of cross-talk may result from multi-path interference caused by grating lobes, which produce unwanted transmission paths between the two routers. Spatial filtering can be applied to inhibit the propagation of light-energy along the unwanted paths, and it can be implemented using any suitable techniques including pinholes, reflectors, waveguides, and multi-mode interferometers (MMIs). The resulting passband filter can be designed to generate levels of crosstalk similar to those of conventional passband filters that rely on a single waveguide router.

11 Claims, 5 Drawing Sheets

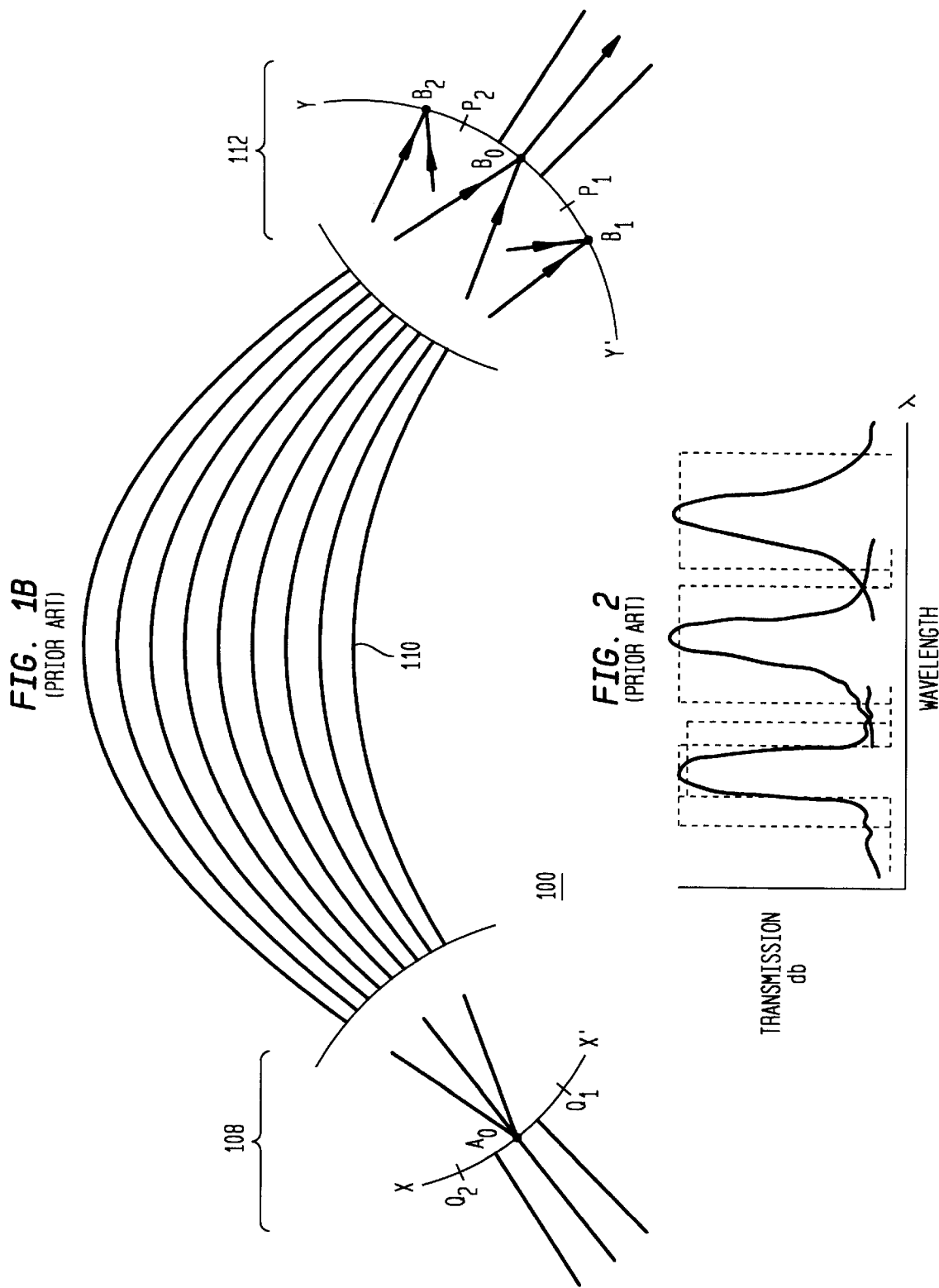

SLIT

REFLECTOR APERTURE $B_0$

OPTICAL PASSBAND FILTERS

BACKGROUND OF THE INVENTION

Field of the Invention

The present invention relates to optical devices, such as wavelength routers and optical multiplexers, used in light-based telecommunications and computer networks.

Description of the Related Art

The demand for higher and higher communication and computer data rates implies a constant need for newer and better technologies to support that demand. One such technology area is fiber-optic communications, in which data is transmitted as light energy over optical fibers. To increase data rates, more than one data channel can be placed on a single fiber link. For example, in wavelength division multiplexing (WDM), the different channels are differentiated by wavelength or color. Such techniques require special components to combine and/or separate the different channels for transmission, switching, and/or receiving. For example, a component for separating channels of a WDM stream would separate light into the distinct wavelength bands that correspond to the different channels. For each channel, the frequency response of an ideal channel separator would be a perfectly flat passband that would transmit all of the light energy for the corresponding channel and only that light energy. In an ideal channel separator, the separation between channels would be distinct. In other words, the channels would be isolated from each other so that there is no crosstalk (i.e., light energy from one channel spilling into another channel).

A wavelength router (also known as an arrayed waveguide grating or a phased array) is an optical device that can be used to combine and/or separate light energy of different wavelengths. A wavelength router selectively routes light of a particular wavelength from an input port to an output port. When used to route light of differing wavelengths from more than one input port and/or to more than one output port, a wavelength router can be used to operate as an optical multiplexer and/or demultiplexer that combines and/or separates light energy of different wavelengths.

FIGS. 1A–B show schematic diagrams of a conventional wavelength router 100 implemented as an integrated device formed on a suitable substrate 102 (e.g., silicon or silica). Router 100 has a plurality of input waveguides 106 adapted to receive light from one or more incoming optical fibers that can be connected to one or more of the input ports 104. Router 100 also has a plurality of output waveguides 114 adapted to transmit light to one or more outgoing optical fibers that can be connected to one or more of the output ports 116. Between the input and output waveguides are two free spaces 108 and 112 separated by a set of waveguides that form the arms 110 of the router.

In operation, light received at one of the input ports 104 is transmitted along the corresponding input waveguide 106 to free space 108. Light entering free space 108 gets radiated for receipt by—and transmission along—each of the router arms 110 towards free space 112. Light entering free space 112 gets radiated towards the output waveguides 114.

Wavelength router 100 is preferably designed such that all of the optical distances from a particular location at the input side of free space 108 (i.e., where one particular of the input waveguides 106 meets free space 108) along each router arm 110 to a particular location on the output side of free space 112 (i.e., where one particular of the output waveguides 114 meets free space 112) differ by an integer multiple of a particular wavelength for the different router arms. As such, light of that particular wavelength entering free space 108 from that particular input waveguide 106 will be focused on the output side of free space 112 at that particular output waveguide 114. That is, light of that particular wavelength will constructively interfere (i.e., add in phase) at that particular output waveguide location, and substantially destructively interfere at all other output waveguide locations. Moreover, light of most other wavelengths will not, in general, be focused (i.e., will effectively destructively interfere) at that particular output waveguide location. As such, wavelength router 100 can be used as an optical passband filter.

Furthermore, to the extent that wavelength router 100 can be designed to focus light having different wavelengths at different output waveguide locations on the output side of free space 112, router 100 can operate as a one-to-many optical multiplexer that can receive light of different wavelengths from a single incoming optical fiber and selectively transmit those different frequencies to different output ports for propagation along different outgoing optical fibers. Similarly, router 100 can be further designed to operate as a many-to-one optical demultiplexer that receives different wavelength light from different incoming optical fibers for transmission to a single outgoing optical fiber, or as a many-to-many optical multiplexer that receives different wavelength light from different incoming optical fibers for transmission to different outgoing optical fibers. Moreover, router 100 may be a symmetric optical device that can be operated in either direction (i.e., either from left to right or from right to left in FIGS. 1A–B). Typically, the router is realized using silica waveguides deposited on a thick substrate of quartz or silicon.

FIG. 2 shows the power that is transmitted from the input of a wavelength router, such as router 100 of FIGS. 1A–B, to the output guides as a function of wavelength. The dashed lines in FIG. 2 correspond to the passbands (i.e., the wavelength ranges of high transmission) for an ideal router in which each passband is flat (i.e., rectangular) and distinct from each other (i.e., not overlapping). The solid lines in FIG. 2 show the frequency responses of the actual passbands of a wavelength router, where the passbands are more Gaussian than rectangular and overlap one another to some degree. As a result, there will be some degree of crosstalk between channels separated using a wavelength router such as router 100 of FIGS. 1A–B.

SUMMARY OF THE INVENTION

The present invention is directed to an optical device that has low crosstalk between channels when separating light energy of different wavelengths into separate channels. Two or more wavelength routers are cascaded together to form a passband filter that can be used to separate different channels of a wavelength division multiplexing (WDM) stream. Cascading wavelength routers can be used to widen and flatten the passbands, but it can also result in increased cross-talk because of multi-path interference caused by grating lobes, resulting in unwanted transmission paths between the two routers. Spatial filtering can be applied to inhibit the propagation of light-energy along the unwanted paths, and it can be implemented using any suitable techniques including pinholes, reflectors, waveguides, and multi-mode interferometers (MMs). The resulting passband filter can be designed to generate levels of crosstalk similar to those of conventional passband filters that rely on a single waveguide router.

BRIEF DESCRIPTION OF THE DRAWINGS

Other aspects, features, and advantages of the present invention will become more fully apparent from the following detailed description, the appended claims, and the accompanying drawings in which:

FIGS. 1A–B show schematic diagrams of a conventional wavelength router;

FIG. 2 shows a graphical representation of the frequency responses of a conventional wavelength router and of an ideal passband channel separator;

DETAILED DESCRIPTION

One way to approximately realize rectangular passbands in a channel separator is to cascade two or more wavelength routers. By properly designing the two routers, one can cause the passband variation of either router to compensate for the variation caused by the other. One then obtains an imaging arrangement whose wavelength transformation is approximately wavelength independent in each passband interval. Then, by properly synchronizing the two routers in each passband interval, as described in U.S. Pat. No. 5,488,680, the teachings of which are incorporated herein by reference, the output image produced by the two routers remains approximately stationary as a function of the wavelength in each passband, thus producing a flat passband behavior.

Unfortunately, simply cascading two ar more routers together can lead to increased crosstalk which results from a different characteristic of conventional wavelength routers—that is, the existence of grating lobes which add unwanted transmission paths between the two routers. The output grating lobes of the first router, for instance, produce unwanted images whose radiation will be partially accepted by the second router, thus causing unwanted transmission components. Unwanted transmission components are also caused by the grating lobes of the second router, as pointed out later.

Figure 1A:
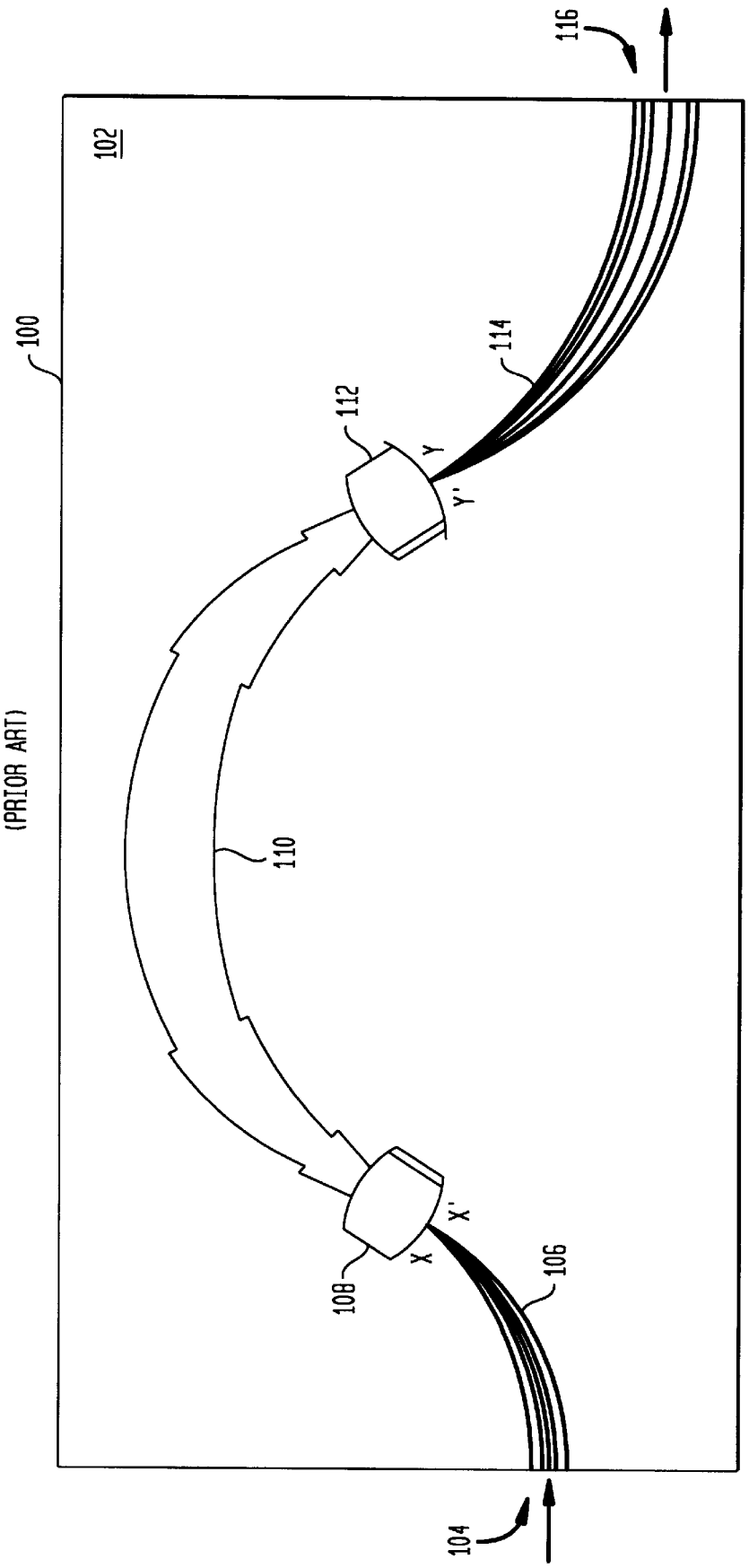

The wavelength router 100 of FIGS. 1A–B provides an imaging arrangement that transforms each input wavelength from a particular input waveguide into an output image transmitted to a particular output waveguide. As shown in FIG. 1B, the input waveguide acts as a point source $A_o$ whose radiation is transformed by the router into an output image whose location $B_o$ is a function of the signal wavelength. This image is produced at the particular location where the contributions from all the arms add in phase, thus producing constructive interference in the resulting interference pattern. An output waveguide located at that particular location $B_o$ will propagate the light energy corresponding to that image.

In addition, a wavelength router will generate unwanted images, called grating lobes, caused by the output periodicity of the arms of the router. These images $B_1$, $B_2$ occur outside the central zone containing the primary image $A_o$, and they are spaced by multiples of the central zone width, which is the interval $P_1$, $P_2$ containing the output waveguides in FIG. 1B. As such, since the unwanted images occur outside this interval, they do not couple into the output waveguides. The width of this zone is determined by the output periodicity of the router arms.

Similarly, at the input, the input zone $Q_1$, $Q_2$ is specified by the input periodicity of the arms, and it determines the interval containing the input waveguides. The router can only receive efficiently input signals that originate from the input zone. For input signals outside this zone, one would like ideally the router to provide zero transmission, whereas, in practice, appreciable transmission is generally caused by the input grating lobes.

Figure 3:
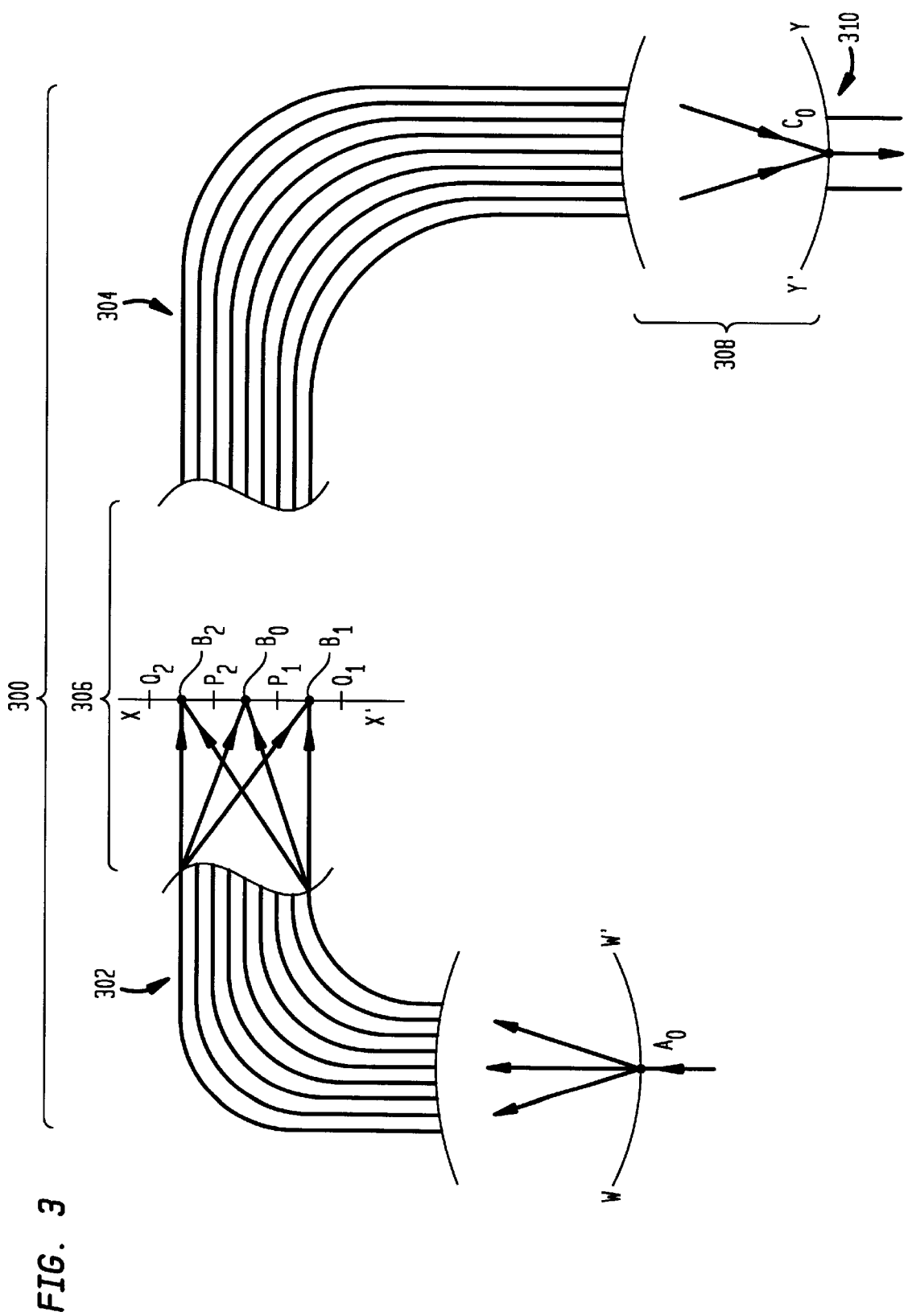
FIG. 3 shows a schematic diagram of a passband filter made from a cascade of two wavelength routers sharing a common free space.

FIG. 3 shows a schematic diagram of a passband filter 300 made from a cascade of two wavelength routers 302 and 304, where the routers share a common free space 306. A particular waveguide at the input of the first router acts as a point source $A_o$, and a corresponding primary image $B_o$ is produced by the first router, inside the interval $P_1$, $P_2$ corresponding to the central zone of the first router. In addition to this primary image, secondary images $B_1$, $B_2$ are produced by the grating lobes of the first router. These unwanted images occur inside the central zone $Q_1$, $Q_2$ of the second router, and they result in unwanted images occurring at the output side of free space 308 at the locations where the output waveguides 310 meet free space 308. Such unwanted images will typically result in unacceptable levels of crosstalk.

In the embodiment of FIG. 3, the central zone $P_1$, $P_2$ of the first router is smaller than the central zone $Q_1$, $Q_2$ of the second router. As a consequence, the above increase in crosstalk is primarily caused by the grating lobes of the first router. However, unwanted transmission components are also caused in general by the grating lobes of the second router. This can be explained by invoking reciprocity, which states that the transmission properties of the two routers are independent of the sense of transmission. Thus, by reversing the sense of transmission one finds that the transmission coefficient in FIG. 3 also contains unwanted components contributed by the grating lobes of the second router. In this case, however, the unwanted images occur outside the interval $Q_1$, $Q_2$.

In general, in order to produce a rectangular passband by cascading two routers as in U.S. Pat. No. 5,488,680, the routers are designed so that their central zones have different widths along the line X–X'. Then, the unwanted images of greatest concern are those that are produced by the router having the smaller zone, since some of these images occur inside the central zone of the other router. Thus, in FIG. 3, the problem is to remove or attenuate the images $B_1$, $B_2$ produced inside $Q_1$, $Q_2$.

Thus, for passband filters made from cascading two or more routers, crosstalk occurs when the device transmits unwanted images. The fact that routers generate unwanted images means that the passband filters will pass wavelengths that are actually outside of the desired band, when the unwanted images from the first router are within the field of view of the second router (i.e., when the central zone of the second router is larger than that of the first router). Furthermore, the frequency response may have side lobes that represent other locations where there is constructive interference for light energy having the same wavelength.

The present invention is directed to an optical device that can provide low crosstalk between channels when separating light energy of different wavelengths into separate channels. According to embodiments of the present invention, the channel separator comprises a cascade of two or more wavelength routers, with each pair of routers separated by a spatial filter. As described above, a wavelength router splits a waveguide (i.e., a medium that acts as a conduit or path for light or waves) containing many wavelengths (or frequencies or colors) into many different waveguides, each containing a different wavelength.

Wavelength routers such as router 100 of FIGS. 1A–B have some special properties. For light coming from a fixed input guide along line X–X', the interferometric nature of the arms 110 separates the wavelengths such that different wavelengths exit at different positions along the line Y–Y'. In other words, as the wavelength changes, the position of the emitted light changes. Moreover, for a given wavelength, as the position of the light source moves along line X–X', the position of the emitted output moves along Y–Y'.

Similarly, in FIG. 3, the position $B_o$ of the primary image produced by the first router varies along the line X–X'. The final image $C_0$, produced at the output of the second router, is also variable, and its variation along Y–Y' is the result of two motions, respectively caused by the two routers. By synchronizing the two routers so that they produce opposite motions in the passbands, the output image will approximately remain stationary in the wavelength intervals corresponding to the passbands, thus approximately producing constant transmission in these intervals. On the other hand, outside of these intervals, by designing the two routers so that their motions are out of synch, the transmission will fall rapidly with wavelength, sharpening the transition between high and low transmission. As a result, the passband becomes more rectangular.

This technique will increase and flatten the passband, but it will also increase the coupling between two passbands, thus increasing crosstalk between different data channels. It is therefore important to eliminate or at least attenuate the side lobes (or grating lobes). As described above with respect to FIG. 3, the side lobes emitted from one router can be coupled into the input of the second router, causing poor channel isolation. According to diffraction theory, these side-lobe images form from the constructive interference of various off-axis beams.

Different embodiments of the present invention are designed to reduce the adverse effects of side-lobe images. Since the side lobes are positioned off axis, a spatial filter, strategically located within the shared free space of two cascaded wavelength routers, can be used to attenuate or even block the passage of light energy corresponding to side-lobe images from one router to the other.

Figure 4A:
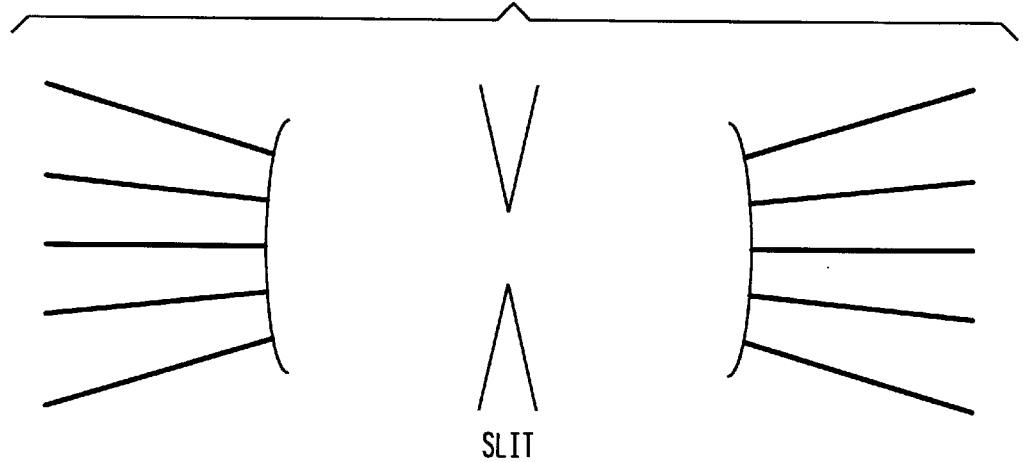
FIGS. 4A–D shows schematic diagrams of the common free space of the passband filter of FIG. 3, according to different embodiments of the present invention.

FIG. 4A shows a schematic diagram of common free space 306 of passband filter 300 of FIG. 3, according to one embodiment of the present invention. In FIG. 4A, the spatial filter is a pinhole or slit in an otherwise opaque barrier.

Figure 4B:
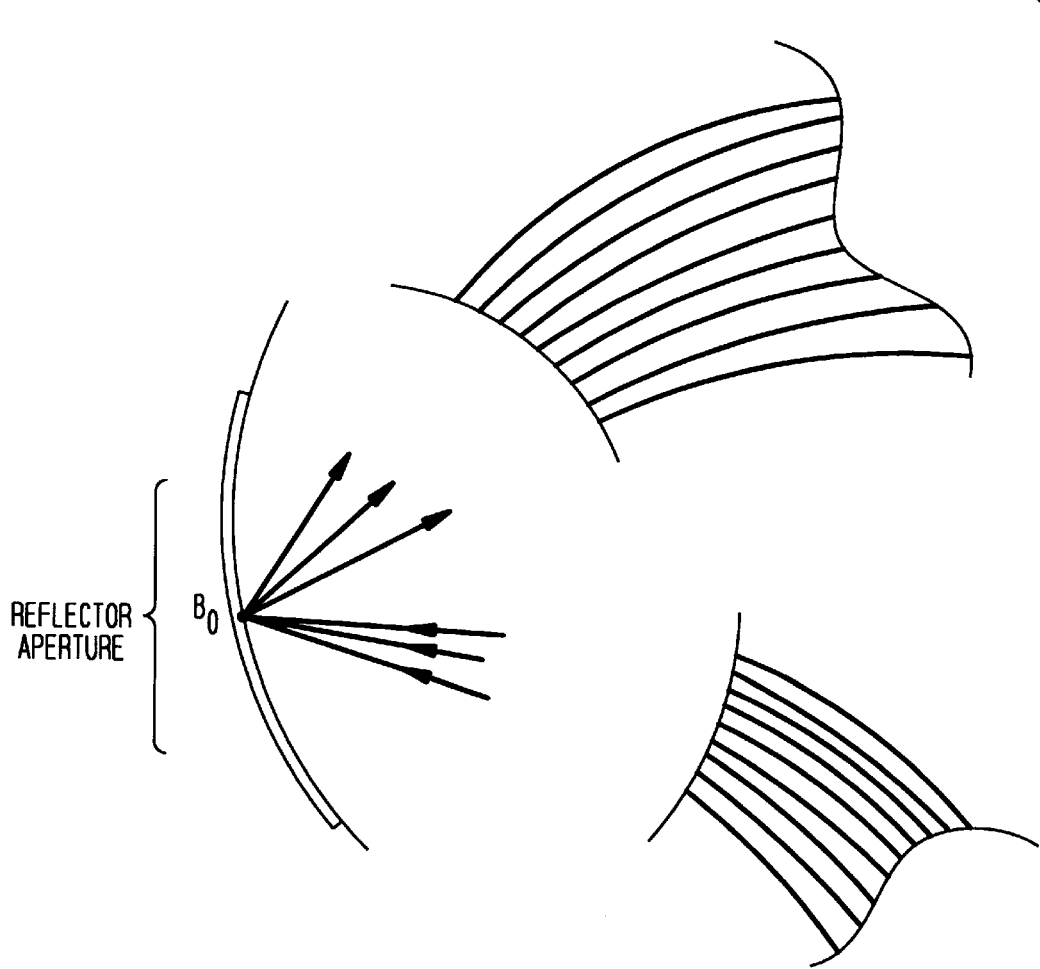

FIG. 4B shows a schematic diagram of common free space 306 of passband filter 300 of FIG. 3, according to an alternative embodiment of the present invention. In FIG. 4B, the spatial filter is a reflector or other type of focusing device that collects and focuses only the desired light from one router to the other. FIG. 4B shows a folded arrangement using a reflector with finite reflecting aperture corresponding to the central zone. The reflector's finite aperture collects and focuses only the desired light from one router to the other. Other light (e.g., that corresponding to the side-lobe images) would not be collected by the reflector aperture. An attractive feature of this folded arrangement is its reduced size.

Figure 4C:
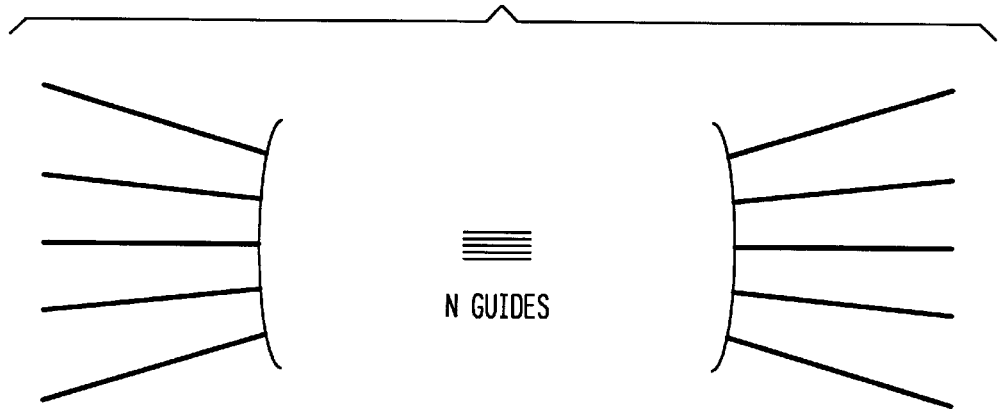

FIG. 4C shows a schematic diagram of common free space 306 of passband filter 300 of FIG. 3, according to another embodiment of the present invention. In FIG. 4C, the spatial filter is a set of waveguides spread over a finite range that can be used to transport only the desired light.

Figure 4D:
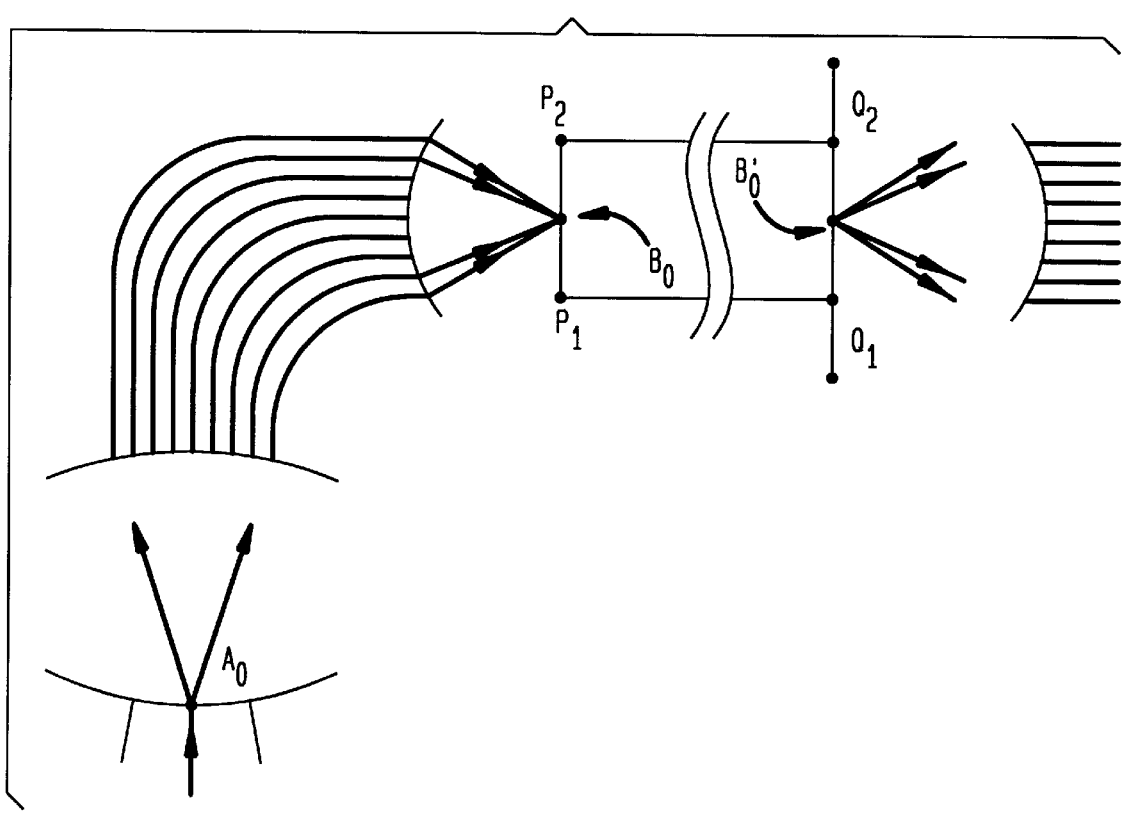

FIG. 4D shows a schematic diagram of common free space 306 of passband filter 300 of FIG. 3, according to yet another embodiment of the present invention. In FIG. 4D, the spatial filter is a multi-mode interferometer (MMI) waveguide that images the on-axis light from one router to the other. An MMI waveguide is a self-imaging device that transfers an input image to the output of the waveguide. An MMI waveguide effectively splits a free space into two smaller free spaces.

As shown in FIG. 4D, an input image $A_o$ appears as image $B_0$ between points $P_1$ and $P_2$ at the input of the MMI waveguide. MMI waveguide will transmit image $B_o$ as an inverted image $B_o'$ appearing between points $Q_1$ and $Q_2$ at the output of the MMI waveguide. Any light falling outside points $P_1$ and $P_2$ will not appear at the output of the MMI waveguide. By properly choosing the MMI aperture in FIG. 4D so that it matches the central zone of the first router, the entire motion of the input image $A_o$ will be transferred with negligible distortion to the output image $B_o$. On the other hand, unwanted images outside the filter aperture will not be accepted by the filter, thus effectively eliminating their contributions to crosstalk.

Further alternative embodiments of the present invention can combine two or more of the different techniques shown in FIGS. 4A–D, as appropriate.

The present invention can be implemented as integrated optical devices that selectively route light energy of different wavelengths with substantially reduced crosstalk between channels.

Devices according to the present invention can be implemented in any suitable materials including semiconductors (e.g., silicon, InP, GaAs), oxides, polymers, fibers, etc. The devices can be used for different applications including detectors, lasers, multiplexers/demultiplexers, add/drop filters, 1×N and N×1 splitters, and N×N arrays. Different devices can be designed to operate with light energy of different wavelength ranges including visible or microwave. The devices can be designed with two or more wavelength routers in cascade, and the wavelength routers can be of different size. The present invention can be used to achieve transmission passband shapes other than rectangles.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An integrated optical device for selectively routing light energy by wavelength, comprising two wavelength routers in cascade separated by a spatial filter adapted to attenuate light energy corresponding to side-lobe images generated by one or both wavelength routers, wherein each wavelength router comprises two free spaces separated by a plurality of router arms.

2. The invention of claim 1, wherein the device separates light energy corresponding to two or more channels, and the attenuation of the side-lobe images reduces crosstalk between the channels.

3. The invention of claim 1, wherein the two wavelength routers share a common free space comprising the spatial filter.

4. The invention of claim 1, wherein the spatial filter comprises a multi-mode interferometer.

5. The invention of claim 1, wherein the spatial filter comprises a reflector.

6. The invention of claim 1, wherein the spatial filter comprises one or more waveguides.

7. The invention of claim 1, wherein the spatial filter comprises an opaque barrier having a pinhole.

8. An integrated optical device for selectively routing light energy by wavelength, comprising two wavelength routers, wherein each wavelength router comprises two free spaces separated by a plurality of router arms and the two wavelength routers are in cascade sharing a common free space.

9. The invention of claim 8, wherein the common free space comprises a spatial filter, separating the two waveguide routers and adapted to attenuate light energy corresponding to side-lobe images generated by one or both wavelength routers.

10. The invention of claim 8, wherein the device separates light energy corresponding to two or more channels, and the attenuation of the side-lobe images reduces crosstalk between the channels.

11. An integrated optical device for selectively routing light energy corresponding to one or more channels by wavelength, comprising:

(a) a first wavelength router means for routing light energy by generating, for each channel, a main image and one or more side-lobe images;

(b) a spatial filter means for attenuating the one or more side-lobe images; and (c) a second wavelength router means for further routing light energy corresponding to the main image.

* * * * *